(No Model.)
T. O. HEAD.
COMBINED PLANTER AND FERTILIZER DISTRIBUTER.
No. 466,236. Patented Dec. 29, 1891.
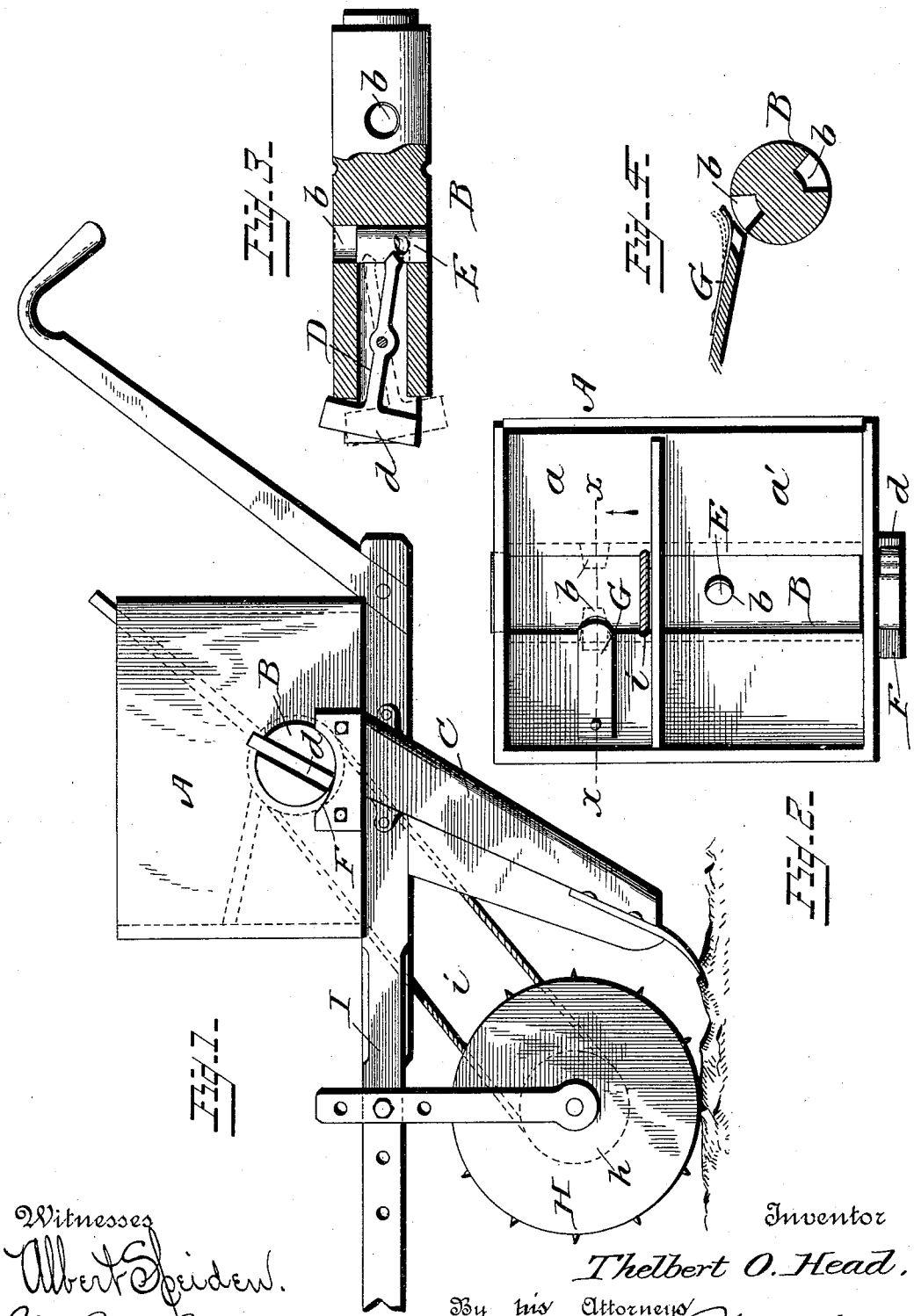
Witnesses
Albert Speiden.
Van Buren Hillyard.
Inventor
Thelbert O. Head.
By his Attorneys

UNITED STATES PATENT OFFICE.

THELBERT OTHO HEAD, OF EUPORA, MISSISSIPPI.

COMBINED PLANTER AND FERTILIZER-DISTRIBUTER.

SPECIFICATION forming part of Letters Patent No. 466,236, dated December 29, 1891.

Application filed September 2, 1891. Serial No. 404,532. (No model.)

*To all whom it may concern:*

Be it known that I, THELBERT OTHO HEAD, a citizen of the United States, residing at Eupora, in the county of Webster and State of Mississippi, have invented certain new and useful Improvements in a Combined Planter and Fertilizer-Distributer; and I do hereby declare the following to be a full, clear, and exact description of the invention, such as will enable others skilled in the art to which it appertains to make and use the same.

This invention relates to a combined planter and fertilizer-distributer, and in common with similar implements aims to provide a simple structure by means of which the grain and the fertilizer are deposited in the same furrow.

A further object of the invention is the provision of a roller having pockets to receive the grain or fertilizer and means for positively ejecting the said grain or fertilizer from the said pockets.

The improvement consists of the novel features and the peculiar construction and combination of the parts which will be hereinafter more fully described and claimed, and which are shown in the annexed drawings, in which—

Figure 1 is a side view of a combined planter and fertilizer-distributer embodying my invention. Fig. 2 is a top plan view of the hopper and the distributing-roller. Fig. 3 is a horizontal section of the distributing-roller, showing the ejecting-lever. Fig. 4 is a cross-section of the distributing-roller on the line $x$ $x$ of Fig. 2, looking in the direction of the arrow.

The hopper A is divided into two compartments $a$ and $a'$, one to receive the grain, the other the fertilizer. The distributing-roller B, journaled at its ends in the sides of the hopper, is provided with pockets $b$, which receive the grain and the fertilizer from the hopper and discharge it into the spout C common to each compartment $a$ and $a'$, by means of which spout the grain and the fertilizer are directed into the same furrow. One of the pockets $b$ is provided with a plunger E, and the distributing-roller is longitudinally recessed to receive the lever D, which is constructed to operate the said plunger to positively eject the grain or fertilizer from the said pocket during the rotation of the said roller. In the preferable form of construction the plunger is located in an opening which is formed through the roller and the ends of the said plunger from the inner closed ends of the said pockets. The plunger is notched at $e$, and the inner end of the lever D projects into the said notch. The cross-head $d$ at the outer end of the lever is adapted to be struck by the cam F at the side of the hopper to operate the said lever at the proper time to eject the grain or fertilizer from the said pockets. The lever D is pivoted between its ends to the roller B. The broad flat spring-guard G, secured at one end to the bottom of the hopper, has its free end rounded and deflected upward and adapted to extend over the roller to prevent the crowding of the grain in the grain-pockets and protect it from injurious contact with the bottom of the hopper.

The caster H, adjustable on the beam I, is provided on one side with pulley $h$, around which and the roller B the endless band $i$ passes to transmit motion from the said caster-wheel to the distributing-roller. The caster-wheel is provided with spurs around its periphery, which enter the ground and insure the rotation of the said caster-wheel as the planter is drawn over the field. The ends of the cross-head $d$ are adapted to project in the path of the cam F and be engaged by the said cam on the rotation of the distributing-roller and operate the plunger.

The pockets having the positively-actuated plunger are primarily designed for fertilizers which have a tendency to clog and remain in the pockets unless discharged by some means. Obviously the plunger may be used equally well with certain kinds of grain.

Having thus described my invention, what I claim, and desire to secure by Letters Patent, is—

1. In a machine for distributing grain and fertilizer, the combination, with a distributing-roller provided with pockets and a movable plunger, of a lever extending lengthwise of the roller and having its inner end constructed to engage with the said plunger and having a projecting portion, and a cam to engage with the said projecting portion of the lever, substantially as and for the purpose described.

2. In a machine for distributing grain and fertilizer, the combination, with a distributing-roller provided with pockets and with a longitudinal recess or bore and a plunger located in the said pocket, of a lever arranged in the said recess and pivoted between its ends and having a cross-head at one end and having its other end in engagement with the said plunger, and a cam to engage with the said cross-head to operate the said lever, substantially as and for the purpose described.

3. The hereinbefore-specified combined planter and fertilizer-distributer, composed of a hopper divided into two compartments, a roller journaled at its ends in the sides of the hopper and having pockets and a longitudinal recess, a plunger located in a set of the pockets, a lever pivoted between its ends in the said longitudinal recess and having engagement with the said plunger and having a cross-head, a cam secured to a side of the hopper to engage with the said cross-head, a caster having a pulley on one side, and a band passing around the said pulley and the roller, substantially as and for the purpose described.

In testimony whereof I affix my signature in presence of two witnesses.

THELBERT OTHO HEAD.

Witnesses:
H. A. GOULD,
J. M. LEWIS.